United States Patent [19]
Christie

[11] 3,966,528
[45] June 29, 1976

[54] APPARATUS AND METHOD FOR JOINING A BRANCHING FITTING TO A PIPE

[76] Inventor: Joe William Christie, Box 386, Frisco, Tex. 75034

[22] Filed: Aug. 14, 1974

[21] Appl. No.: 497,396

[52] U.S. Cl. ............................... 156/293; 156/296; 156/499; 156/538; 269/37; 269/41; 269/60; 269/65; 269/78
[51] Int. Cl.² ..................... B23Q 3/18; B25B 1/20; B32B 31/20
[58] Field of Search ........... 156/304, 499, 293, 296, 156/538; 269/37, 41, 42, 60, 62, 65, 77, 78

[56] References Cited
UNITED STATES PATENTS

| | | | |
|---|---|---|---|
| 2,787,234 | 4/1957 | Mach | 269/60 |
| 3,616,024 | 10/1971 | Windle | 156/304 |
| 3,729,360 | 4/1973 | McElroy | 156/499 |
| 3,743,566 | 7/1973 | Louthan et al. | 269/41 |
| 3,846,208 | 11/1974 | McElroy | 156/499 |

*Primary Examiner*—Caleb Weston
*Attorney, Agent, or Firm*—Richards, Harris and Medlock

[57] ABSTRACT

Disclosed is an apparatus and method for connecting a fitting to a side wall of a pipe. The apparatus includes a frame comprising two ring clamps for mounting the frame on the pipe. Guide rods extend perpendicularly and outwardly of the pipe. A base plate is slidably mounted on the guide rods for movement relative to the pipe. A receiving member on the base plate is adapted to receive the fitting to be joined to the pipe. A top bar is fixedly attached between the ends of the guide rods remote from the rings. A threaded shaft is positioned with one end attached to the receiving member and with its second end passing through the top bar. Within the top bar are means for selectively engaging the threaded shaft so that the shaft may be translated through the top bar by turning the shaft. Alternatively, the shaft may be disengaged from the top bar whereby the shaft may be moved freely through the top bar. In operation, the threaded shaft, and thus the receiving member and fitting attached thereto, may be advanced toward the pipe during the joining of the fitting to the pipe by pushing the threaded shaft through the top bar when the threaded shaft is not engaged with the top bar or by turning the threaded shaft when the threaded shaft is engaged with the top bar.

10 Claims, 5 Drawing Figures

APPARATUS AND METHOD FOR JOINING A BRANCHING FITTING TO A PIPE

BACKGROUND OF THE INVENTION

1. Field of the Invention

This invention relates to a method and apparatus for joining branching fittings to conduit lines and particularly, for heat welding thermoplastic branching fittings to thermoplastic pipe mains.

2. Prior Art

During the last decade, the growth in industrial applications of thermoplastic piping for gas, water, sewage and chemical product handling has been phenomenal. The tremendous increase in use of thermoplastic piping and fittings has resulted from the realization of their unique properties of strength, durability, flexibility, resistance to attack by chemicals and other elements, and economy. These properties make thermoplastic systems safe, serviceable, rugged and economical.

With the tremendous growth in the use of thermoplastic pipes and hardware has come the need for methods and tools for joining the pipe to form desired channels of distribution. Such distribution channels are more readily constructed with thermoplastic components since the piping and hardware may be joined or repaired through the use of a heat fusion method of welding. In this welding method, the surfaces of the members to be welded are first heated to the point where they begin to melt and then are pressed together until they solidify. The pipes and fittings to be joined vary in size. Fittings may be joined to pipe measuring twelve inches in diameter or larger. Particularly where such large pipe and mating fittings are used, equipment and techniques are required to assure that the fitting is properly aligned with the pipe, that the proper pressure is exerted on the fitting against the pipe and that the apparatus is quick and easy in its operation.

Joining apparatus presently used generally lack accurate means of exerting pressure on the fitting against the pipe main, means for quickly withdrawing the fitting from the heater element when the surfaces are properly plasticized and means for quickly engaging the fitting against the pipe before any cooling of the surfaces to be joined occurs. The absence of any one of these means may form a joint unacceptable or faulty for the purposes intended. Proper alignment is necessary because a precise and uniform contact pressure must be achieved during welding. Accurate control of the pressure on the fitting against the pipe is critical since too little contact pressure will result in an ineffective weld whereas too great a pressure will cause excessive displacement of the plasticized material leaving excessively cool material at the point of contact between the fitting and main thereby creating an insufficient weld. The quick operation of the unit is necessary in that the weld will be of sufficient strength only if the contact material is properly plasticized at the time of joining. This can best be accomplished by heating the surfaces to be joined to the precise temperature required followed by immediate contact between the mating surfaces.

SUMMARY OF THE INVENTION

The present invention provides an improved apparatus for joining a branching fitting to a main pipe. The apparatus is attached to the main pipe and branching fitting and provides for the free reciprocation of the fitting toward and away from the main pipe. The apparatus further provides a means for selectively exerting and controlling pressure on the branching fitting against one surface of a removable heating unit and the main pipe.

More particularly, the improved apparatus for joining a thermoplastic branching fitting to a thermoplastic main pipe comprises two clamping rings for selective attachment around a main pipe. Connected to and extending outwardly from the rings are guide rods joined at their opposite ends by a top bar. A base member is slidably mounted on the guides. A receiver member adapted to releasably support a branching fitting is carried by the base member. A threaded shaft extends parallel to the guide rods and through a bore in the top bar. One end of the threaded shaft is rotatably attached to the base member while the other end carries a handle facilitating rotation. The bore in the top bar through which the threaded shaft passes is of sufficient size to allow the threaded shaft to slide axially therethrough.

Located in a cavity in the top bar is a spring release bar pinned at one end and having a threaded semibore mating with the threaded shaft. The unpinned end of the spring release bar rests against an insert spring in the top bar. This insert spring holds the spring release bar away from engagement with the threaded shaft. By compressing the insert spring, the spring release bar may be depressed into the cavity in the top bar member. When the spring release bar is depressed, the threaded semibore of the spring release bar engages the mating threads on the shaft.

A releasing mechanism is attached to the top bar member. The spring release bar may be retained in the engaged position with the threaded shaft by the releasing mechanism. With the threads of the spring release bar engaged against the threaded shaft, turning the threaded shaft translates the shaft through the top bar member, thereby sliding the base member along the guide rods. With the spring release bar disengaged from the threaded shaft, the threaded shaft may be translated through the top bar member by simply pushing or pulling the threaded shaft. Thus, the receiver member may be translated toward or away from the main along the guide rods by pushing or pulling the threaded shaft when the spring release bar is not engaged with the threaded shaft. Alternatively, when the spring release bar is engaged with the threaded shaft, the receiver member may be moved toward or away from the main by turning the threaded shaft.

Removably mounted on the guide rods is a heating unit. The unit consists of a heating element having a concave inner face which substantially conforms to the curvature of the pipe main. The heating element further has a convex outer face which substantially conforms to the surface of the fitting to be joined to the main. A handle is attached to the upper part of the heating element to facilitate the application and removal of the heating unit. Attached to each side of the heating element are brackets having slots therein for accepting the guide rods. These brackets are adapted to slidably engage the guide rods and thereby allow the heating unit to be axially positioned on the guide rods.

In joining a branching fitting to a pipe main, the two rings are securely fastened around the pipe main. Through the use of various size inserts or collets, the rings may be adapted to secure the apparatus to mains having varying outside diameters. The fitting is positioned in the receiver member carried by the base plate. In an alternative embodiment, a collar is placed around the shank of the fitting before positioning the fitting in the receiver member. The collar comprises a tubular portion protruding from a flange section substantially conforming to the flange of the fitting. The inner diameter of the collar is sized to produce a resilient engagement between the collar and the shank of the fitting thereby retaining the fitting in place. The flange of the collar serves to retain the fitting in proper alignment during the joining process. The fitting is then placed into the receiving member.

The heating unit is slidably positioned between the fitting and the main by engaging the slots in the brackets attached to the heating unit onto the guide rods. The fitting is advanced by pushing the threaded shaft toward the main until the portion of the fitting to be joined to the main is brought into contact with the face of the heating element and the opposite face of the heating element is engaged against the main. The heating element is automatically aligned with the main and fitting by the arrangement of the brackets attached to the heating element which ride on the guide rods and allow the free translation of the heating unit toward and away from the main. When the surface of the main and the fitting reach the proper temperatures to melt the thermoplastic and permit them to be joined by welding, the fitting is disengaged from the heating unit. The unit is then withdrawn from the main by lifting the heating unit from its position on the guide rods. The fitting is then advanced toward the main by pushing in on the threaded shaft until there is contact between the fitting and the main. The spring release bar is then engaged with the threaded shaft. The fitting may then be forcefully advanced against the main by turning the threaded shaft. Proper pressure may be applied by varying the advancement of the threaded shaft through the top bar. When the fitting and main joint has sufficiently cooled, the apparatus is detached from the fitting and the main.

BRIEF DESCRIPTION OF THE DRAWINGS

For a more complete understanding of the present invention and the objects and advantages thereof, reference is now made to the following description taken in conjunction with the accompanying drawings, in which.

DESCRIPTION OF THE PREFERRED EMBODIMENT

Figure 1:
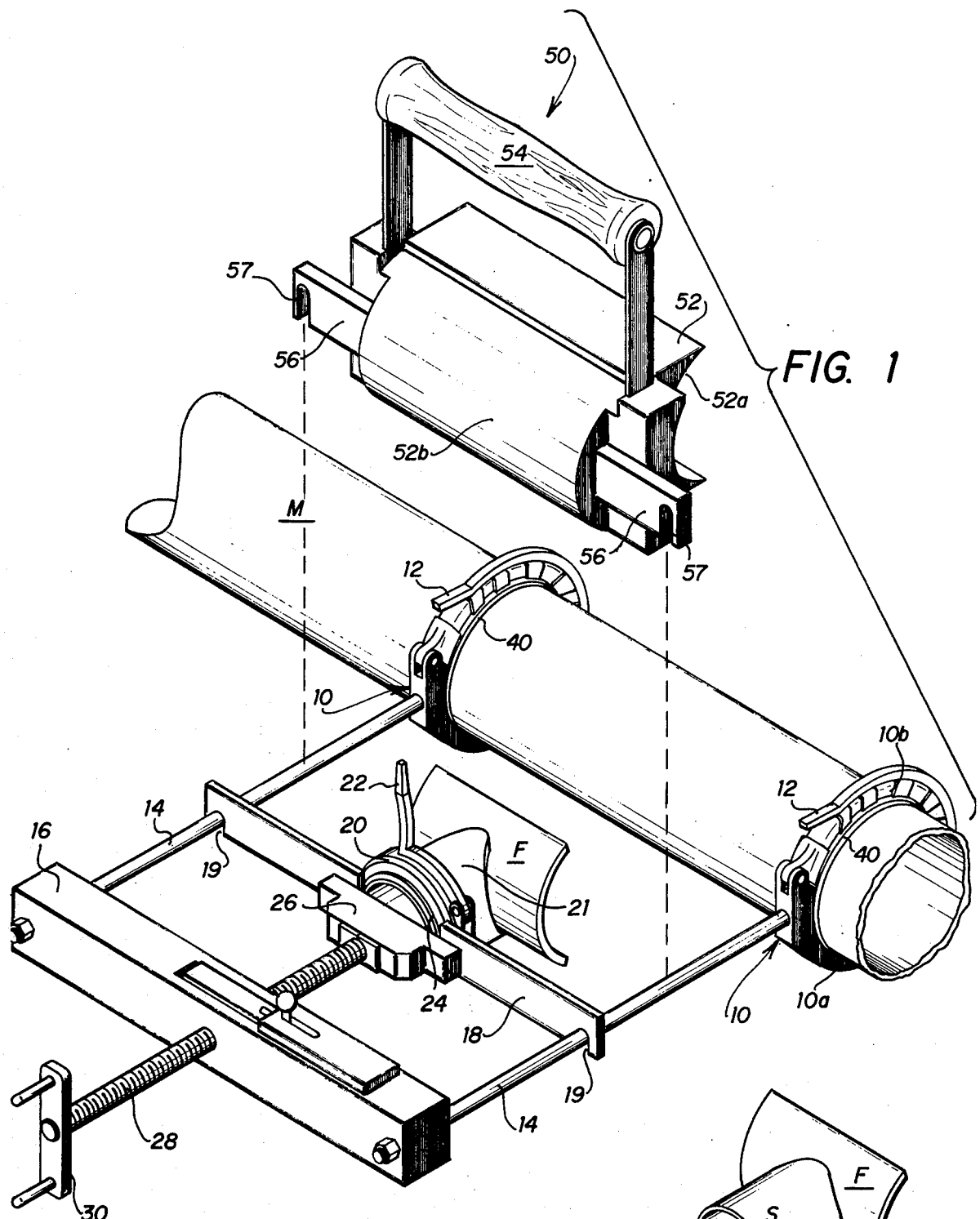
FIG. 1 is an exploded perspective view of the improved joining apparatus embodying the present invention with a pipe main and fitting held thereby and showing the heating unit.
Figure 2:
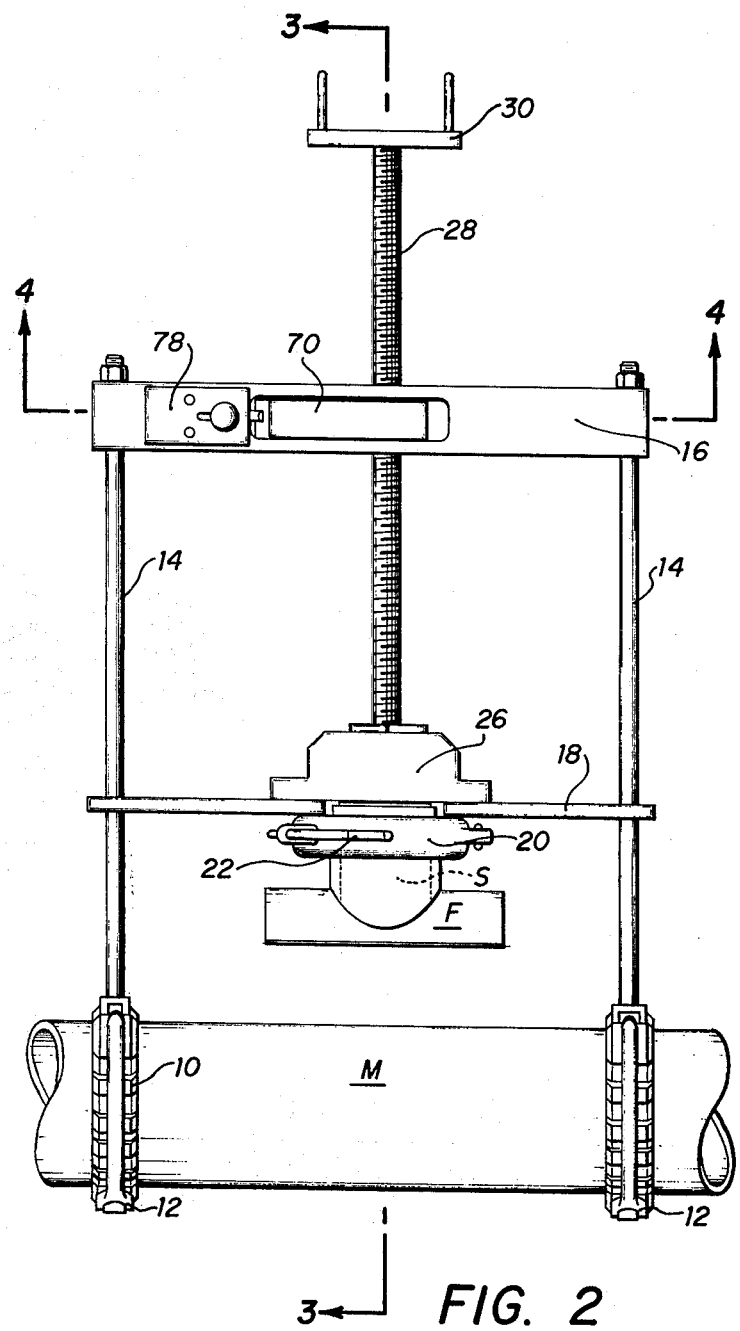
FIG. 2 illustrates a top plan view of the joining apparatus embodying the present invention with a pipe main and fitting held thereby.
Figure 3:
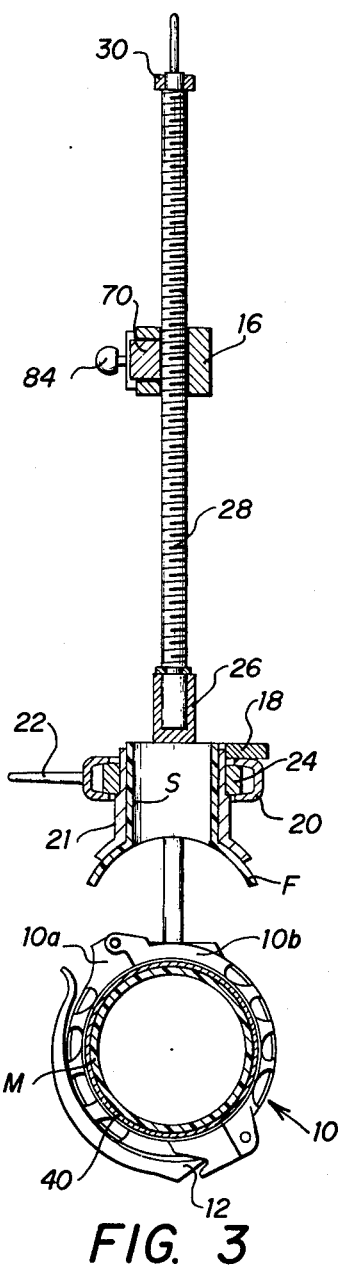
FIG. 3 illustrates a section of the apparatus shown in FIG. 2 taken generally along sectional lines 3—3 looking in the direction of the arrows.

Referring now to the drawings, wherein like reference characters designate like or corresponding parts throughout the several views, there is illustrated in FIGS. 1, 2, and 3 an apparatus embodying the present invention attached to a pipe main with a branching fitting in position to be joined to the main. The apparatus has two cold rings 10 for attachment around the thermoplastic pipe main M. As is best shown in FIG. 1, cold rings 10 each consist of two hinged half rings 10a and 10b. Half rings 10a and 10b may be locked in a closed position to form a circular clamp around main M by a locking mechanism 12. Connected to and extended outwardly from the cold rings are guide rods 14. The ends of the guide rods 14 remote from the ends joined to rings 10 are connected by a top bar 16. Slidably mounted on guide rods 14 is a base plate 18 which is formed with a slot 19 at each end thereof. Slots 19 accept guide rods 14 and allow base plate 18 to axially slide along guide rods 14.

Attached to base plate 18 is receiver member 20 adapted to accept the fitting F to be joined to thermoplastic main M. Receiver member 20 is a circular clamp having a hinged upper and lower halves. These halves may be opened to allow the shank S of fitting F to be positioned within the receiving member. The two hinged portions are retained in their closed position to form the completed clamp around the fitting F by a locking handle 22. Fitted within the receiver member 20 are collet inserts 24. Collets 24 are semicircular bands which conform to the inner surface of the receiver member 20 and are attached thereto by any suitable means. By varying the thickness of collets 24 the receiver member 20 can be adapted to support various sizes of fittings F. Also connected to the base plate 18 is a retaining bracket 26. Joined to retaining bracket 26 is a threaded shaft 28 which extends parallel to guide rods 14 and passes through the top bar member 16. The end of threaded shaft 28 is adapted with a handle 30 used to rotate shaft 28.

Fitted within cold rings 10 are collet inserts 40. Collets 40 are formed with an outer surface conforming to the inner surface of cold rings 10 and having an inner surface conforming to the main M. A pair of collets of the required thickness correspond to each size of pipe used with the joining apparatus and thus serve to adapt cold rings 10 to varying sizes of pipe mains.

A heating unit generally indicated by numeral 50 is shown for removable mounting on guide rods 14. Heating unit 50 consists of a heating element 52 having electrical heating coils interspersed throughout the interior of the unit. The heat generated by these coils in turn heats the surface of the heating element for use in the joining process. The element has a concave inner face 52a substantially conforming to the curvature of the pipe main M to which the fitting F is to be joined. Element 52 further has a convex outer face 52b substantially conforming to the surface of the fitting F to be joined to main M. Handle 54 is attached to the upper part of heating element 52 to facilitate the application and removal of the heating unit. Attached to each side of heating element 52 are saddle brackets 56 with slots 57 designed to accept guide rods 14. Saddle brackets 56 are adapted to slidably engage guide rods 14 and to allow heating unit 50 to be easily axially positioned on guide rods 14.

Figure 4:
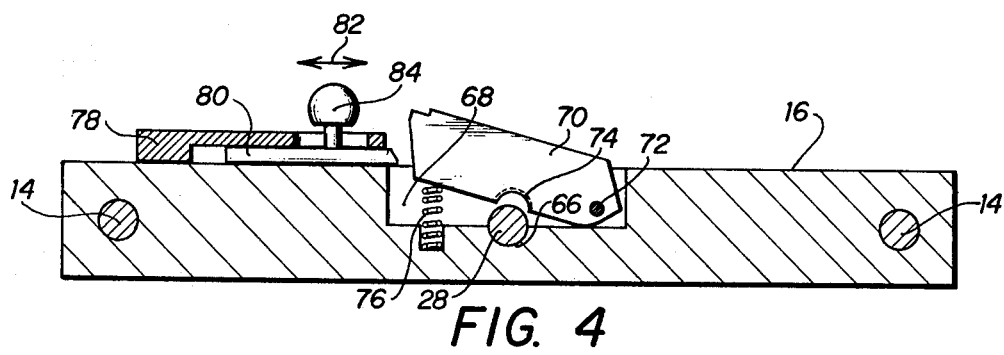
FIG. 4 illustrates a section of the engaging and release mechanism embodied in the invention taken generally along sectional lines 4—4 of FIG. 2 looking in the direction of the arrows.

Referring now to FIG. 4, a bore 66 in the top bar member 16 through which the threaded shaft 28 passes is of sufficient size to allow the threaded shaft to slide freely therethrough. Located in a cavity 68 in top bar 16 is a spring release bar 70, pinned at one end by pin 72 and having a threaded semibore 74 which selectively mates with the threads of threaded shaft 28. The unpinned end of spring release bar 70 rests against an insert spring 76 in the top bar 16. Insert spring 76 serves to urge the spring release bar 70 to move in a direction away from engagement with threaded shaft 28.

A releasing mechanism member 78 is attached to top bar member 16 and houses a slidable release pin 80 which is movable in the direction of arrows 82 by applying a force on knob 84. Spring release bar 70 may be depressed into cavity 68 in top bar member 16 by pivoting spring release bar 70 about pin 72 and by compressing insert spring 76. Upon depression of spring release bar 70 into cavity 68, the threaded semibore 74 of spring release bar 70 engages the mating threads on shaft 28. Spring release bar 70 is retained in this engaged position by sliding release pin 80 over the movable end of spring release bar 70. With the threads of spring release bar 70 engaged against threaded shaft 28, turning handle 30 attached to threaded shaft 28 translates the shaft through top bar member 16 thereby sliding base plate 18 along guide rods 14. Receiver member 20 and retaining bracket 26 move with base plate 18 as plate 18 is translated toward and away from main M. With spring release bar 70 disengaged from threaded shaft 28, as when releasing pin 80 is not in engagement over spring release bar 70, threaded shaft 28 may be axially translated through top bar member 16 by simply pushing or pulling handle 30.

Figure 5:
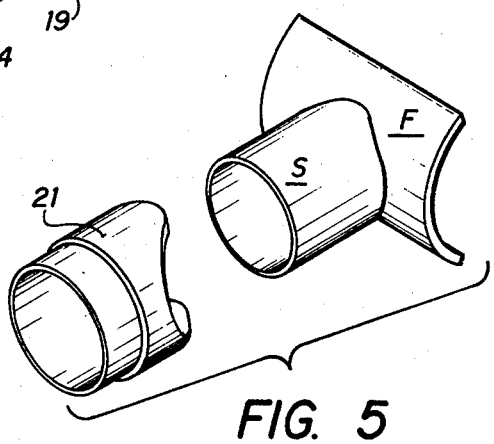
FIG. 5 illustrates a collar used in the practice of the invention fitted on a branching fitting prior to joining of the fitting to a pipe main.

In joining branching saddle fitting F to main M, the two cold rings 10 attached to guide rods 14 are securely fastened around main M. Through the use of various size collets 40, cold rings 10 may be adapted to secure the apparatus to mains having varying outside diameters. A pair of collets 24 are secured to receiver member 20 by a suitable means to adapt member 20 to the particular fitting to be joined to the main M. The fitting F is placed into member 20 adapted with collets 24 and handle 22 is used to securely fasten the two portions of member 20 around the shanks of fitting F. In an alternative embodiment, a collar 21, shown in FIGS. 3 and 5, is placed around shank S of fitting F before positioning fitting F in member 20. Collar 21 comprises a tubular portion protruding from a flange section which substantially conforms to the flange on fitting F. The inner diameter of collar 21 is sized to produce a resilient engagement between collar 21 and shank S of fitting F and thereby retains the fitting in place. The fitting F is then placed into member 20 adapted with collets 24 and handle 22 is then used to securely fasten receiver member 20 around collar 21.

The use of collar 21 over shank S of fitting F before positioning the fitting into member 20 has several advantages. The collar allows a more even distribution of the compressive load applied by member 20 against shank S thereby preventing damage to the shank by member 20. Additionally, the flange section of collar 21 serves to retain fitting F in proper alignment during the joining process. After completion of the connection of fitting F to pipe main M, collar 21 serves as a safeguard against damage to the joint by withdrawal of threaded shaft 28 and member 20 without disengaging member 20 from fitting F. Without the use of collar 21, the withdrawal of member 20 securing fitting F before disengagement of the member from fitting F would tend to rupture the joint between the fitting and the main. Where collar 21 is used, a safeguard against such rupture of the joint is provided since the withdrawal of the receiver member 20 without the disengagement of the member from fitting F would only remove collar 21 without affecting the joint. The resilient engagement between collar 21 and shank S of fitting F is sufficient only to retain the fitting in place during the heating and joining process. The fit is so designed to allow the collar to be pulled from the fitting without exerting a damaging force on the fitting-main joint if member 20 is inadvertently withdrawn without being disengaged from fitting F.

With cold rings 10 attached to main M and fitting F secured in member 20, heating unit 50 is slidably positioned between fitting F and main M by engaging the slots in saddle brackets 56 onto guide rods 14. Fitting F is advanced by pushing handle 30 toward main M until the portion of fitting F to be joined to main M is brought into contact with face 52b of heating unit 50 and the concave face 52a of heating unit 50 is engaged against main M. Heating of main M and the portion of fitting F which is to be joined to main M is thus accomplished by "sandwiching" the heating unit 50 between main M and fitting F through the use of the joining apparatus. The heating unit 50 is automatically aligned with main M and fitting F by the arrangement of saddle brackets 56 which ride on guide rod 14 and allow the free translation of the heating unit toward and away from main M.

Of course, if additional pressure against the heating element is desired, the spring release bar 70 may be engaged against threaded shaft 28 and pressure may be applied by turning the shaft and thus advancing it and fitting F against the heating unit.

When the surfaces of main M and fitting F reach the proper temperatures to melt the thermoplastic and permit them to be joined by welding, the fitting F is disengaged from the heating unit by releasing spring release bar 70 and then withdrawing handle 30. The heating unit 50 is then withdrawn from main M by lifting the heating unit 50 by handle 54. Fitting F is advanced toward the main M by pushing in on handle assembly 30 until there is a contact between fitting F and main M. Spring release bar 70 is then engaged with threaded shaft 28 by depressing release bar 70 and sliding the releasing pin 80 over the movable end of spring release bar 70 to retain release bar 70 in its engaged position with threaded shaft 28. Now, fitting F may be forcefully advanced against main M by turning handle 30 of the threaded shaft 28. Proper pressure may be applied by varying the advancement of threaded shaft 28 through top bar 16.

When the fitting-main joint has sufficiently cooled, receiver member 20 securing fitting F to base plate 18 and cold rings 10 attaching the apparatus to main M are disengaged and the apparatus removed. An opening substantially conforming to the inner diameter of the shank of fitting F is bored through the side of the pipe main. Piping is then joined to the branching fitting shank S by conventional methods. In this way, fluids passing through pipe main M may now communicate through the branching fitting and into the branching pipe connected thereto.

It will thus be seen that the present invention provides a means of accurately positioning fitting F relative to main M during heating and of quickly and accurately joining fitting F to main M after heating. The apparatus further provides a means for accurately exerting pressure on fitting F during heating and during the joining process and for generating the large pressures necessary for the achievement of a successful joint where large fittings and mains are employed. The apparatus also may be freely adapted to use various types and shapes of fittings by changing receiving member 20 to accept the fitting used. It has also been seen that the present invention may be adapted to accommodate differing sizes of such fittings with relative ease and speed.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An apparatus for attaching a fitting to a side wall of a pipe with the axis of the fitting being substantially perpendicular to the axis of the pipe, comprising:
   at least two cold rings for attachment to the pipe;
   removable inserts mounted within said cold rings for accommodating varying sizes of pipe;
   a guide rod attached to each of said cold rings and extending outwardly therefrom perpendicular to the axis of the pipe;
   a base plate slidably mounted on said guide rods for movement relative to the pipe;
   a receiver member fixed to said base plate and adapted to receive the fitting to be joined to the pipe;
   removable inserts mounted within said receiver member for accommodating varying sizes of fittings to be joined to the pipe;
   a top bar fixedly attached between said guide rods;
   a threaded shaft with one end attached to said receiver member and with the second end passing through said top bar;
   an engaging member in said top bar having a semi-bore threaded therein with threads which mate with those of said threaded shaft such that selective engagement between said shaft and said engaging member may be had by depressing the engaging member until it is engaged with the threads on said shaft whereby said shaft may be translated through said top bar by turning said shaft; and
   a removable heating unit slidably positioned on said guide rods having one face substantially conforming to the shape of the side wall of the pipe and with a second face substantially conforming to the shape of the fitting to be joined to the pipe so that said fitting and side wall of the pipe may be heated by said heating unit prior to joining.

2. The apparatus in claim 1 wherein said removable heating unit comprises:
   a main heating element; and
   saddle brackets extending from said main heating element having slots therein which correspond to said guide rods such that said heating unit is slidable on said guide rods.

3. The apparatus in claim 1 and further comprising:
   a collar removably engaged over the shank of the fitting before the fitting is secured in said receiver member whereby said collar provides a safeguard against damage to the fitting by said receiver member and damage to the joint between the fitting and the pipe by disengaging from the fitting when the receiver member is withdrawn before removing said receiver member from the fitting after joining the fitting to the pipe.

4. An apparatus for use in attaching a fitting to a side wall of a pipe, comprising:
   at least two cold rings for attachment to the pipe;
   a guide rod attached to each of said cold rings and extending outwardly therefrom perpendicular to the axis of the pipe;
   a base plate slidably mounted on said guide rod for movement relative to the pipe;
   means associated with said base plate for receiving the fitting to be joined to the pipe;
   a top bar fixedly attached between said guide rods;
   a shaft with one end connected to said fitting receiving means and with the second end passing through said top bar;
   force means associated with said top bar for controlling the translation of said shaft and said fitting receiving means toward the pipe; and
   means for alternatively engaging and disengaging said shaft from said force means to allow translation of said shaft through said top bar by actuating said force means when said force means is engaged with said shaft or by pushing or pulling said shaft when said force means is disengaged from said shaft.

5. An apparatus for use in attaching a fitting to a side wall of a pipe, comprising:
   a frame;
   means on said frame for engaging a section of the pipe;
   receiving means adapted to receive the fitting to be joined to the pipe;
   a threaded shaft with one end attached to said receiving means and the second end passing through an opening in said frame such that said threaded shaft may axially slide therethrough; and
   selectively engageable means movable between a first position whereby said shaft may be translated through said frame by turning said shaft and a second position whereby said shaft may be moved freely through said frame.

6. In an apparatus for attaching a fitting to a side wall of a pipe having a frame, means on the frame for engaging a section of the pipe, receiving means adapted to receive the fitting to be joined to the pipe, reciprocating means attached to the frame for translating the fitting receiving means toward the pipe during attachment of the fitting to the pipe, the improvement comprising:
   a screw mechanism for translating the fitting receiving means toward the pipe during attachment of the fitting to the pipe;
   selectively engageable means movable between a first position whereby the fitting receiving means may be forced against the pipe by turning said screw mechanism and a second position whereby the fitting receiving means may be moved freely toward or away from the pipe; and
   a removable heating unit slidably positioned on the frame having one face substantially conforming to the shape of the side wall of the pipe and with a second face substantially conforming to the shape of the fitting to be joined to the pipe so that the fitting and side wall of the pipe may be heated by said heating unit prior to joining.

7. The apparatus in claim 6 wherein said screw mechanism comprises:

a threaded shaft with the first end attached to the fitting receiving means and the second end passing through an opening in the frame such that said threaded shaft may axially slide therethrough; and means within the frame for selectively engaging said threaded shaft so that said threaded shaft may be translated through the frame by turning the shaft and for releasing the engagement with said shaft so that said shaft may move freely through the frame.

8. The apparatus of claim 6 wherein said heating unit comprises:

a main heating element; and a saddle fitting extending from each side of said heating element having slots therein which follow the frame and allow positioning of said heating element relative to the fitting and the pipe.

9. The apparatus of claim 6 and further comprising:

removable inserts within the means for engaging a section of the pipe for accommodating varying sizes of pipe; and removable inserts adapted within the fitting receiving means for accommodating varying sizes of fittings to be joined to the pipe.

10. A method for clamping and moving a fitting against the side wall of a pipe whereby the fitting may be attached to the pipe, comprising the steps of:

attaching at least two cold rings to the pipe each having a guide rod attached thereto and extending outwardly therefrom perpendicular to the axis of the pipe;

securing the fitting to be joined to the pipe to a base plate slidably mounted on the guide rods;

placing a heating element on the pipe area to which the fitting is to be joined;

forcing the fitting and base plate against the side of the heater opposite that adjacent the pipe by turning a threaded shaft attached at one end to the base plate and with its other end passing through a top bar attached to the guide rod ends opposite the guide rod ends attached to the cold ring;

heating the areas on the pipe and fitting to be joined;

withdrawing the fitting from the heating element by pulling the threaded shaft away from the pipe;

removing the heating element from the surface of the pipe;

pushing the threaded shaft and fitting toward the pipe;

engaging the top bar against the threads of the threaded shaft; and turning the threaded shaft to exert a force on the base plate and fitting to effect a proper pressure on the fitting during the joining of the fitting to the pipe.

* * * * *